(12) United States Patent
Katakura et al.

(10) Patent No.: US 8,304,060 B2
(45) Date of Patent: Nov. 6, 2012

(54) GLASS WITH MOLDING

(75) Inventors: Seiji Katakura, Tokyo (JP); Masatoshi Nishida, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 432 days.

(21) Appl. No.: 12/445,619

(22) PCT Filed: Oct. 11, 2007

(86) PCT No.: PCT/JP2007/069832
§ 371 (c)(1),
(2), (4) Date: Apr. 15, 2009

(87) PCT Pub. No.: WO2008/047669
PCT Pub. Date: Apr. 24, 2008

(65) Prior Publication Data
US 2010/0316848 A1 Dec. 16, 2010

(30) Foreign Application Priority Data
Oct. 16, 2006 (JP) .................. 2006-281822

(51) Int. Cl.
*B32B 3/02* (2006.01)

(52) U.S. Cl. .......... 428/192; 428/339; 52/204.1
(58) Field of Classification Search .......... 428/192, 428/339; 52/204.1
See application file for complete search history.

(56) References Cited

U.S. PATENT DOCUMENTS

| | | | |
|---|---|---|---|
| 4,139,234 A * | 2/1979 | Morgan | 296/201 |
| 4,974,901 A * | 12/1990 | Katayama | 296/201 |
| 5,233,805 A * | 8/1993 | Hirai et al. | 52/204.597 |
| 5,393,362 A * | 2/1995 | Culler | 156/153 |
| 5,534,316 A * | 7/1996 | Yada et al. | 428/31 |
| 6,196,615 B1 * | 3/2001 | Yada | 296/93 |

FOREIGN PATENT DOCUMENTS

| | | |
|---|---|---|
| JP | 48-40921 | 5/1973 |
| JP | 59-151857 | 10/1984 |
| JP | 2001-347541 | 12/2001 |
| JP | 2003-127671 | 5/2003 |
| JP | 2006-111751 | 4/2006 |

* cited by examiner

*Primary Examiner* — Gerard Higgins
*Assistant Examiner* — Christopher Polley
(74) *Attorney, Agent, or Firm* — Rankin, Hill & Clark LLP

(57) ABSTRACT

Glass having metal moldings with improved continuity. The outer surface (18) of an end of a metal molding (13) is flush with an outer surface (19) of a resin molding (16) so that there is no step between the outer surfaces.

9 Claims, 4 Drawing Sheets

GLASS WITH MOLDING

TECHNICAL FIELD

This invention relates to a molding-furnished glass including a metal molding.

BACKGROUND ART

A technique is known in the art in which a resin molding is integrally molded to a peripheral border of a glass substrate, and fitted into the edges of an opening in a structure, whereby the glass is installed in a vehicle body or the like.

There has also been proposed a molding-furnished glass that includes a metal molding, in which a metal molding is used on part of an outside surface of the resin molding, thereby increasing design latitude (e.g., Japanese Patent Application Laid-Open Publication No. 2003-127671 A).

The molding-furnished glass disclosed in the 2003-127671 A publication will now be described with reference to FIG. 7 hereof.

As shown in FIG. 7, a glass 100 with a molding has a resin molding 102 secured on the peripheral border of a window glass 104 using double-sided adhesive tape 103. The resin molding 102 has a metal molding 101.

The metal molding 101 is arcuate in cross-section, and skirt parts 105, 105 thereof are embedded in the resin molding 102. Specifically, part of the resin molding 102 covers the skirt parts 105, 105, whereby the metal molding 101 is prevented from detaching from the resin molding 102.

The molding-furnished glass of this type as disclosed in the 2003-127671 A publication will now be described with reference to FIGS. 8, 9, and 10, using an example in which the molding-furnished glass is applied to a triangular window of an automobile.

An automobile 110 in FIG. 8 comprises a triangular window 111 and a front door 112. A metal molding 113 is fitted on the edges of the triangular window 111, and a metal molding 114 is provided additionally to the edges of the front door 112.

The metal moldings 113, 114 are integrally molded with the resin moldings 115, 116, respectively; as shown in FIG. 9.

As seen in FIG. 10, an end part of the length of the metal molding 113 is embedded in the resin molding 115. Specifically, an overlapping part 117, which is a part of the resin molding 115, covers the end part of the metal molding 113. As a result, the metal molding 113 is prevented from detaching from the resin molding 115.

The metal moldings 113, 114 in FIG. 9 are a reflective, metallic color. The resin moldings 115, 116 are generally a matte, dark color. Continuity between the metal molding 113 and the metal molding 114 is compromised, and the exterior appearance deteriorates, because a region designated T1 in the drawing lies between the matte, dark resin moldings 115, 116.

DISCLOSURE OF THE INVENTION

Problem Sought to be Solved by the Invention

It is an object of the present invention to provide a molding-furnished glass capable of improving continuity between metal moldings.

Means to Solve the Problem

According to the present invention, there is provided a molding-furnished glass, which comprises: a glass substrate; a resin molding covering a periphery of the glass substrate; and a metal molding locally covering the resin molding, wherein the metal molding comprises a long object that has an end part with an exterior surface being flush with an exterior surface of the resin molding so that no step is created between the exterior surfaces.

Preferably, the metal molding includes an area held in contact with the end part of the metal molding, which area, as measured in a longitudinal direction of the long object, has a design thickness falling in a range of 0.8 to 1.5 mm, and most preferably a thickness of 1 mm.

Desirably, the metal molding is bonded to the resin molding using an adhesive.

The adhesive may be a polyester/polyisocyanate adhesive.

In a desired form, the metal molding has on opposite ends thereof burrs formed by cutting, which burrs are oriented in a direction of penetration into the resin molding.

Advantages of the Invention

In the molding-furnished glass of the present invention, since an exterior surface of the end part of the metal molding is structured to be flush with an exterior surface of the resin molding so that there is no step therebetween, the end part of the metal molding does not have to be covered by the resin molding. The metal molding therefore has a more aesthetic design, as well as increased visual appeal.

The thickness of the resin molding that is in contact with the end part of the metal molding is set to 0.8 to 1.5 mm as a design value. Empirically speaking, the processing error and error entailed in molding the resin are of a value that is less than 0.8 mm; therefore, it is possible for the resin molding to reliably remain on the edge of the metal molding, and for the end part of the metal molding to be prevented from being exposed.

The metal molding is bonded to the resin molding using an adhesive; therefore, no concerns will be presented that the metal molding will separate from the resin molding.

Since a polyester/polyisocyanate adhesive is used for the adhesive, the adhesive strength obtained therewith will be greater than an acrylic adhesive or an epoxy adhesive, and favorable results will be obtained when the resin molding and the metal molding are joined together.

A burr formed on either end of the metal molding due to cutting is deliberately left in place. The burr penetrates into the resin molding and serves as an anchor or pin. Removing the burr is unnecessary; therefore, no labor is expended on their removal, and processing costs can be reduced.

Figure 1:
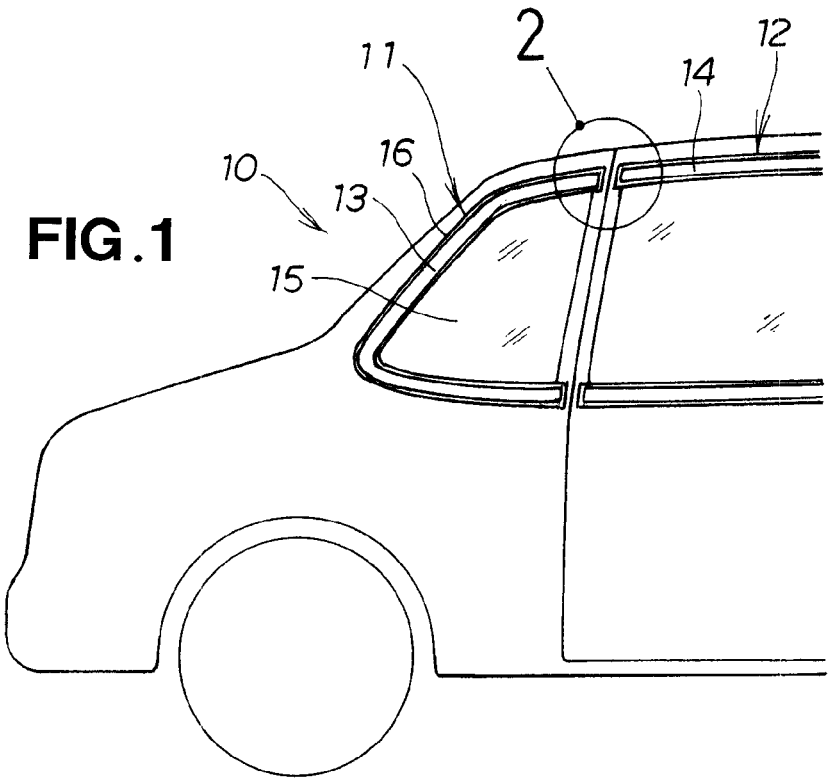
FIG. 1 is a side elevational view showing a front part of an automobile.

KEYS 13 metal molding
15 glass substrate
16 resin molding
18 exterior surface
19 exterior surface
23 burr
25 adhesive
t thickness

BEST MODE FOR CARRYING OUT THE INVENTION

Certain preferred embodiments of the present invention are described below, by way of example, with reference to the attached drawings.

An automobile 10 shown in FIG. 1 comprises a triangular window 11 and a front door 12. A metal molding 13 is fitted on the edges of the triangular window 11, and a metal molding 14 is provided additionally to the edges of the front door 12.

The triangular window 11 is a molding-furnished glass, wherein a resin molding 16 covers a perimeter of a glass substrate 15, and a metal molding 13 locally covers the resin molding 16.

Figure 2:
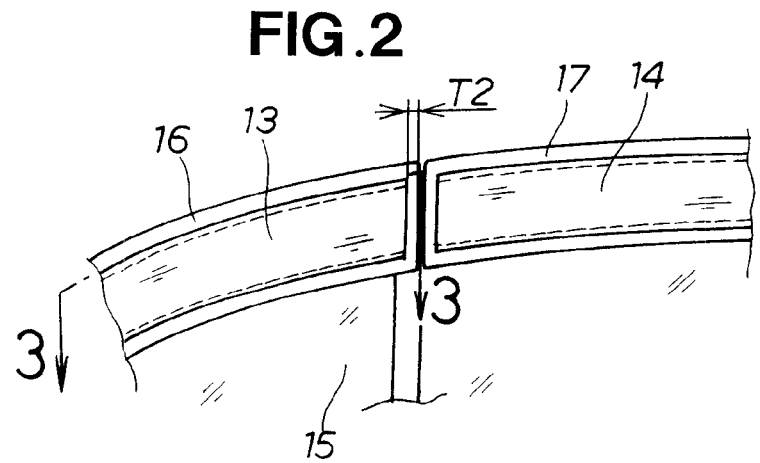
FIG. 2 is an enlarged view of section 2 of FIG. 1.

As shown in FIG. 2, the resin molding 16 covers the edges of the glass substrate 15, and the metal molding 13 covers the resin molding 16.

Figure 3:
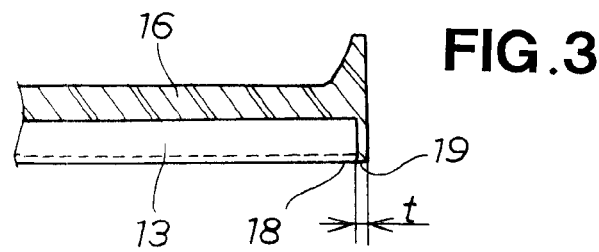
FIG. 3 is a cross-sectional view taken along line 3-3 of FIG. 2.

At an end part of the metal molding 13, an exterior surface 18 of the end part and an exterior surface 19 of the resin molding 16 are structured to be flush so that there is no step therebetween, as shown in FIG. 3. As measured in the longitudinal direction of the long object, a thickness t of the resin molding 16 in the area in contact with the end part of the metal molding 13 is set to a range of 0.8 to 1.5 mm as a design value; in particular, the thickness is preferably set to about 1 mm.

A long object cut to a predetermined length is used for the metal molding 13, as described hereinbelow. Performing the cutting entails a certain degree of processing error. An investigation revealed that processing error in automobile windows is ±0.2 mm. Furthermore, when the metal molding 13 is placed in an injection mold, a placement error of ±0.3 mm has been encountered. Adding the placement error to the processing error results in an error of ±0.5 mm.

As long as the thickness t of the resin molding 16 set at 0.8 mm, then even if the error described above is −0.5 mm (maximum negative value), it is possible to ensure that the thickness of the resin molding will be 0.3 mm, and no concerns will be presented that the end part of the metal molding 13 will be exposed. If the end part is exposed, there is a risk that the end part may scratch the operator, or that other difficulties may arise; however, no such concerns arise with the present invention.

The metal moldings 13, 14 in FIG. 2 are a reflective, metallic color. The resin moldings 16, 17 are generally a matte, dark color. A region designated T2 in the drawing lies between the matte, dark resin moldings 16, 17, but is of insignificant size; i.e., 1 to 3 mm. As a result, the metal molding 13 and the metal molding 14 appear to be continuous, and the exterior appearance is appealing. Specifically, the end part of the metal molding 13 does not have to be covered by the resin molding 16; therefore, the metal molding 13 has a more aesthetic design, as well as increased visual appeal.

Burrs left in the metal molding 13 will now be described.

Figure 4A:
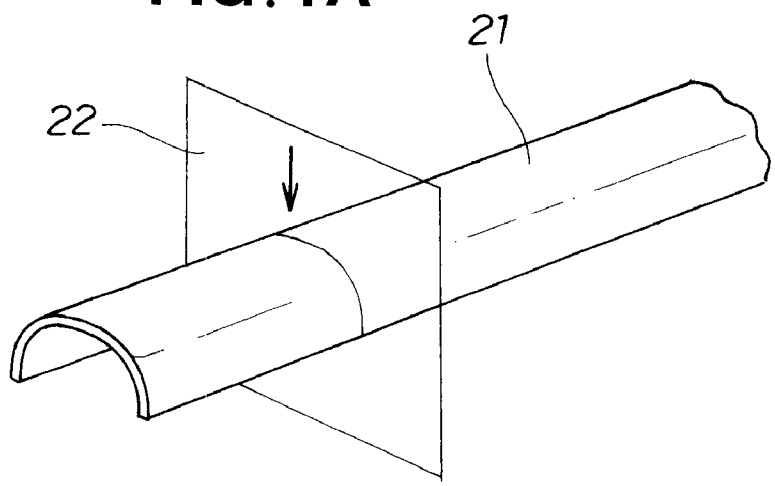
FIG. 4A is a view showing a long object used for manufacturing a metal molding.
Figure 4B:
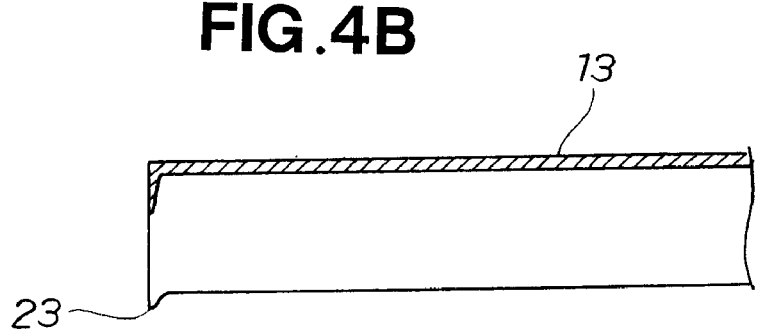
FIG. 4B is a cross-sectional view showing a metal molding obtained by cutting the long object of FIG. 4A along a cutting plane and seen in a longitudinal direction thereof.

FIGS. 4A and 4B are drawings illustrating a process for cutting the metal molding. As shown in FIG. 4A, there is employed a long object 21 manufactured using extrusion or drawing, the molding being arcuate in cross-section. Extrusion or drawing can be adopted as the processing technique as long as the longitudinal cross-section remains uniform. These techniques can be used for mass-production, and can significantly reduce processing costs to a greater degree than pre-cutting and press-bending.

The long object 21 is 5 to 15 m in length, and is accordingly cut to a predetermined length using a high-speed cutter. In the drawing, reference numeral 22 designates the cutting plane, and the downward-pointing arrow indicates the cutting direction. Cutting produces a burr 23, as shown in FIG. 4B. The burr 23 is generally removed in a burr-removal step; however, in the present invention the burr 23 may be left intact.

Figure 5:
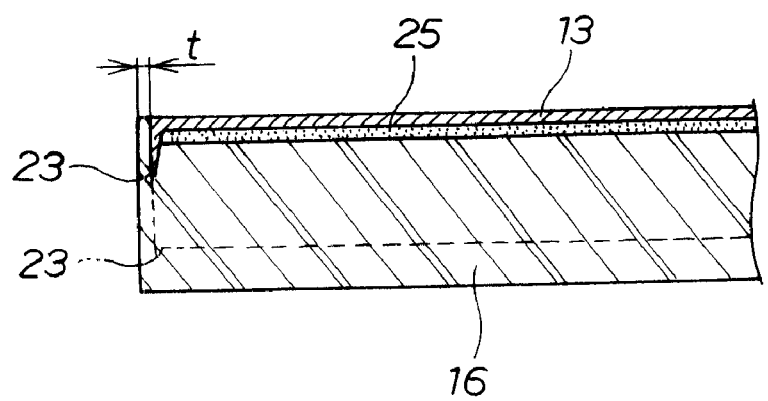
FIG. 5 is a cross-sectional view of a molding according to the present invention.

FIG. 5 shows a cross-section of the molding. The metal molding 13 is integrally molded with the resin molding 16 when injection molding is performed, at which time the burr 23 faces toward the center of the resin molding 16. As a result, the burr 23 penetrates into the resin molding 16, and serves as an anchor or pin for coupling the metal molding 13 to the resin molding 16.

Allowing the burr 23 to remain makes it possible to omit the burr-removal step, reduce processing costs, and increase the degree of connection made with the resin molding 16.

Figure 7:
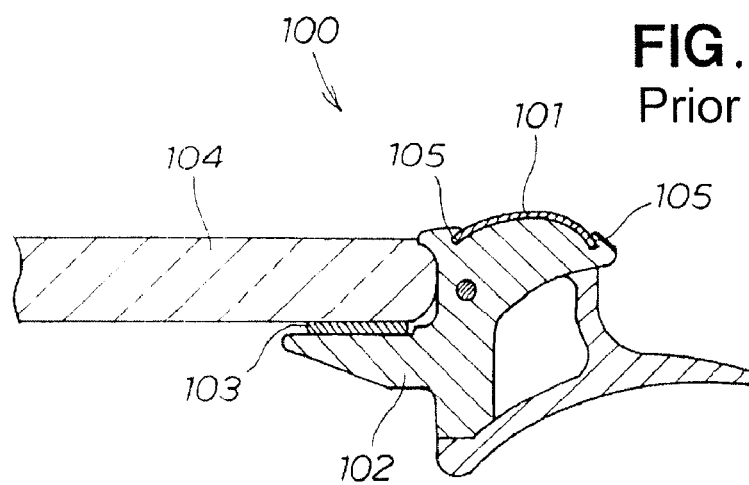
FIG. 7 is a cross-sectional view showing a conventional molding-furnished glass.
Figure 8:
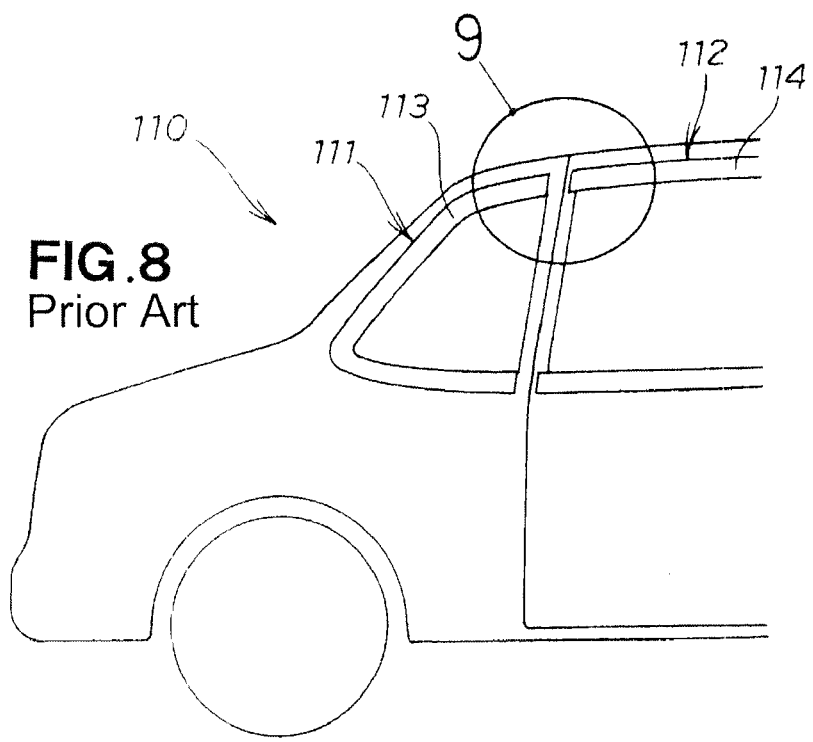
FIG. 8 is a side view showing an example in which the conventional molding-furnished glass is applied to an automobile.
Figure 9:
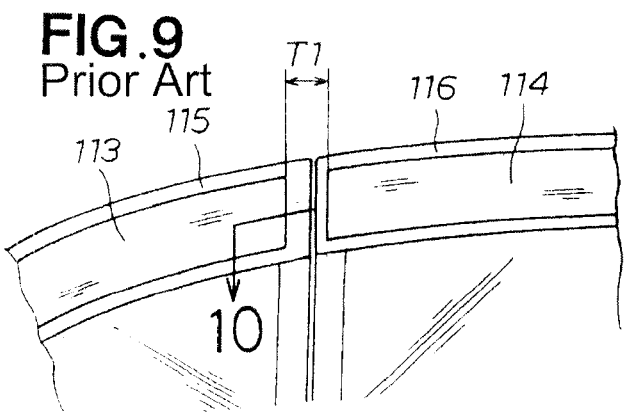
FIG. 9 is an enlarged view of section 9 of FIG. 8.
Figure 10:
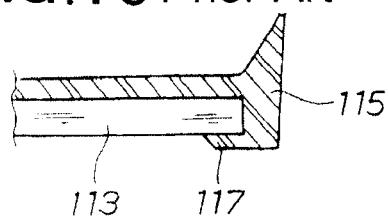
FIG. 10 is a cross-sectional view taken along line 10 of FIG. 9.

Since the end part of the metal molding 13 is flush with the resin molding 16, a concern is presented in regard to the metal molding 13 separating from the resin molding 16. Accordingly, an adhesive 25 is preferably used to bond the metal molding 13 to the resin molding 16. As illustrated in FIG. 7, double-sided adhesive tape 103 is utilized for bonding a glass 104 and a resin molding 102 together; however, it is less common to use the adhesive 25 for bonding the metal molding 13 and the resin molding 16 together.

Accordingly, the present inventors performed studies to decide upon a type of adhesive 25 for bonding the metal molding 13 and the resin molding 16 together.

Figure 6:
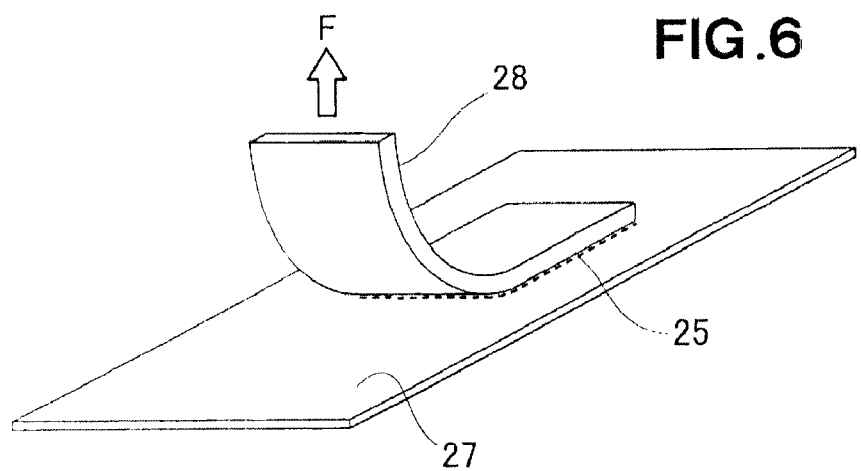
FIG. 6 is a view illustrating a delamination test.

FIG. 6 illustrates a delamination test. A plate 27 made of stainless steel (hereinafter referred to as an "SUS") (SUS430MA) and measuring 50 mm×150 mm×0.5 mm was prepared as a metal molding; a plate 28 made of PVC (vinyl chloride resin) and measuring 25 mm×100 mm×2.5 mm was prepared as a resin molding; and an acrylic adhesive, an epoxy adhesive, and a polyester/polyisocyanate adhesive were prepared.

The PVC board 28 was affixed to the SUS board 27 using the adhesive 25, which had been applied at a thickness of about 15 μm. After the adhesive was allowed to cure, the PVC board 28 was forcibly peeled away. The force F necessary to peel away the PVC board shall be referred to as "peel strength" for convenience. The experiment was conducted 8 or 12 times under identical conditions in order to increase reliability. The results are shown in Table 1 below.

TABLE 1

| Sample number | Adhesive | Peel strength (N) | Average value (N) | Standard deviation (N) |
|---|---|---|---|---|
| 1 | Acrylic | 87.5 | 84.2 | 15.7 |
| 2 | Acrylic | 91.0 | | |

TABLE 1-continued

| Sample number | Adhesive | Peel strength (N) | Average value (N) | Standard deviation (N) |
|---|---|---|---|---|
| 3 | Acrylic | 105.0 | | |
| 4 | Acrylic | 97.5 | | |
| 5 | Acrylic | 92.0 | | |
| 6 | Acrylic | 83.0 | | |
| 7 | Acrylic | 86.5 | | |
| 8 | Acrylic | 102.0 | | |
| 9 | Acrylic | 86.5 | | |
| 10 | Acrylic | 61.0 | | |
| 11 | Acrylic | 66.0 | | |
| 12 | Acrylic | 52.0 | | |
| 13 | Epoxy | 124.0 | 109.8 | 13.0 |
| 14 | Epoxy | 121.0 | | |
| 15 | Epoxy | 124.0 | | |
| 16 | Epoxy | 94.5 | | |
| 17 | Epoxy | 102.5 | | |
| 18 | Epoxy | 112.5 | | |
| 19 | Epoxy | 87.0 | | |
| 20 | Epoxy | 113.0 | | |
| 21 | Polyester/polyisocyanate | 130.0 | 136.2 | 10.7 |
| 22 | Polyester/polyisocyanate | 141.0 | | |
| 23 | Polyester/polyisocyanate | 149.5 | | |
| 24 | Polyester/polyisocyanate | 129.5 | | |
| 25 | Polyester/polyisocyanate | 158.5 | | |
| 26 | Polyester/polyisocyanate | 129.5 | | |
| 27 | Polyester/polyisocyanate | 130.0 | | |
| 28 | Polyester/polyisocyanate | 151.0 | | |
| 29 | Polyester/polyisocyanate | 135.0 | | |
| 30 | Polyester/polyisocyanate | 128.0 | | |
| 31 | Polyester/polyisocyanate | 125.0 | | |
| 32 | Polyester/polyisocyanate | 127.0 | | |

Samples 1 to 12:

An acrylic adhesive was used as the adhesive. The maximum value of the peel strength was 105 N (newtons), the minimum value was 52 N, the average value was 84.2 N, and the standard deviation was 15.7 N.

Sample numbers 13 to 20:

An epoxy adhesive was used as the adhesive. The maximum value of the peel strength was 124 N (newtons), the minimum value was 87 N, the average value was 109.8 N, and the standard deviation was 13.0 N.

Sample numbers 21 to 32:

A polyester/polyisocyanate adhesive was used as the adhesive. The mixing ratio was set at 10/1 (polyester resin/polyisocyanate resin).

The maximum value of the peel strength was 158.5 N (newtons), the minimum value was 125 N, the average value was 136.2 N, and the standard deviation was 10.7 N.

In Samples 21 to 32, wherein a polyester/polyisocyanate adhesive was used, the peel strength (average value) was greater than for the other adhesives, and the standard deviation was lower than for the other adhesives, indicating excellent attachment strength and reliability. Therefore, a polyester/polyisocyanate adhesive is preferably used to bond the resin molding 16 and the metal molding 13 together.

If a silane coupling agent is applied to the metal molding 13 in advance, and covered by the adhesive 25, it will be possible to further improve water-resistance and other indices of adhesive reliability.

The molding-furnished glass of the present embodiment was described using a triangular window by way of example; however, the present invention may be used on the glass of a door window, a windshield, a rear window, or the roof. The molding-furnished glass of the present invention is suitable for use in windows of vehicles including automobiles and rolling stock, but may also be used in non-vehicular applications such as windows of buildings and watercraft.

The metal molding does not have to be made of SUS, and may be a plated steel molding or an imitation metal molding made by plating a hard resin molding.

INDUSTRIAL APPLICABILITY

The molding-furnished glass of the present invention is particularly suitable for use as triangular windows of automobiles and is additionally suitable for use in doors, windshields, rear windows and roofs of the automobiles as well as in windows of vehicles such as rolling stock. The glass is also useful in non-automotive applications, e.g., for use in windows of buildings and watercraft.

The invention claimed is:

1. A molding-furnished glass comprising:
   a glass substrate;
   a resin molding covering a periphery of the glass substrate; and
   a metal molding locally covering the resin molding,
   wherein the metal molding is an elongated object and has a longitudinal end part, the resin molding has a portion that extends beyond and completely covers the longitudinal end part of the metal molding, the longitudinal end part of the metal molding has an exterior surface being flush with an exterior surface of the portion of the resin molding so that no step is created between the exterior surfaces of the longitudinal end part of the metal molding and the portion of the resin molding in the longitudinal direction of the metal molding and the resin molding, and the resin molding does not cover the exterior surface of the longitudinal end part of the metal molding.

2. The molding-furnished glass of claim 1, wherein the portion of the resin molding extends beyond the metal molding by a predetermined distance in the range of 0.8 to 1.5 mm.

3. The molding-furnished glass of claim 1, wherein the portion of the resin molding extends beyond the metal molding by a predetermined distance of 1 mm.

4. The molding-furnished glass of claim 1, wherein the metal molding is bonded to the resin molding using an adhesive.

5. The molding-furnished glass of claim 4, wherein the adhesive comprises a polyester/polyisocyanate adhesive.

6. The molding-furnished glass of claim 1, wherein the metal molding has on opposite ends thereof burrs formed by cutting, and the burrs are oriented in a direction of penetration into the resin molding.

7. The molding-furnished glass of claim 1, wherein the molding-furnished glass comprises a polyester/polyisocyanate adhesive layer over the resin molding, a silane coupling agent layer over the adhesive layer, and the metal molding over the silane coupling agent layer.

8. The molding-furnished glass of claim 1, wherein the metal molding is made of stainless steel.

9. The molding-furnished glass of claim 1, wherein the metal molding is made of a plated steel molding.

* * * * *